United States Patent
Stoltz

(10) Patent No.: US 8,310,823 B2
(45) Date of Patent: Nov. 13, 2012

(54) PORTABLE DIGITAL COMPUTER

(76) Inventor: Henning Stoltz, Hamburg (DE)

( * ) Notice: Subject to any disclaimer, the term of this patent is extended or adjusted under 35 U.S.C. 154(b) by 0 days.

(21) Appl. No.: 12/597,433

(22) PCT Filed: Apr. 21, 2008

(86) PCT No.: PCT/EP2008/003182
§ 371 (c)(1),
(2), (4) Date: Apr. 9, 2010

(87) PCT Pub. No.: WO2008/131882
PCT Pub. Date: Nov. 6, 2008

(65) Prior Publication Data
US 2010/0277856 A1 Nov. 4, 2010

(30) Foreign Application Priority Data

Apr. 25, 2007 (DE) .......................... 10 2007 019 840
Jul. 23, 2007 (DE) .......................... 10 2007 028 995

(51) Int. Cl.
*G06F 1/16* (2006.01)
*H05K 5/00* (2006.01)
*H05K 7/00* (2006.01)

(52) U.S. Cl. ......... 361/679.17; 361/679.08; 361/679.14; 361/679.15; 361/679.16

(58) Field of Classification Search ............. 361/679.02, 361/679.06–679.18, 679.21, 679.26–679.29, 361/679.55
See application file for complete search history.

(56) References Cited

U.S. PATENT DOCUMENTS

| | | | | |
|---|---|---|---|---|
| 5,175,672 A * | 12/1992 | Conner et al. | ........... | 361/679.09 |
| 5,196,993 A * | 3/1993 | Herron et al. | ........... | 361/679.29 |
| 5,229,757 A * | 7/1993 | Takamiya et al. | ........... | 345/168 |
| 5,247,285 A * | 9/1993 | Yokota et al. | ........... | 361/679.17 |
| 5,260,884 A * | 11/1993 | Stern | ........... | 361/679.1 |
| 5,260,885 A * | 11/1993 | Ma | ........... | 361/679.26 |
| 5,341,154 A * | 8/1994 | Bird | ........... | 345/167 |
| 5,646,820 A * | 7/1997 | Honda et al. | ........... | 361/679.6 |
| 5,719,799 A * | 2/1998 | Isashi | ........... | 708/105 |
| 5,793,606 A * | 8/1998 | Cubbage et al. | ........... | 361/679.29 |
| 5,995,025 A * | 11/1999 | Sternglass et al. | ........... | 341/22 |
| 6,006,243 A * | 12/1999 | Karidis | ........... | 708/100 |
| 6,028,764 A * | 2/2000 | Richardson et al. | ........... | 361/679.29 |
| 6,104,604 A * | 8/2000 | Anderson et al. | ........... | 361/679.55 |
| 6,205,021 B1 * | 3/2001 | Klein et al. | ........... | 361/679.17 |
| 6,219,229 B1 * | 4/2001 | Lee | ........... | 361/679.08 |

(Continued)

OTHER PUBLICATIONS

English translation of the International Preliminary Report on Patentability and the Written Opinion from PCT/EP2008/003182, issued Nov. 10, 2009 (5 pages).

(Continued)

*Primary Examiner* — Adrian S Wilson
(74) *Attorney, Agent, or Firm* — Kilpatrick Townsend & Stockton LLP

(57) ABSTRACT

The invention relates to a portable digital computer having a housing on which a keyboard, a detachable mouse and a swivelling monitor are disposed. The housing (10, 11) is configured in two parts and contains the accumulators only. The two housing parts can be swivelled by another hinge (12, 13) parallel to the first, and the keyboard (15) can be detached from the housing. A CD-ROM player (30) and the data processor are accommodated behind the monitor (14). The two housing parts (10, 11) can be laid one upon the other and serve as a support structure for the monitor.

17 Claims, 6 Drawing Sheets

U.S. PATENT DOCUMENTS

| | | | |
|---|---|---|---|
| 6,256,192 B1 * | 7/2001 | Shannon | 361/679.06 |
| 6,256,193 B1 * | 7/2001 | Janik et al. | 361/679.59 |
| 6,353,529 B1 * | 3/2002 | Cies | 361/679.05 |
| 6,392,871 B1 * | 5/2002 | Yanase | 361/679.07 |
| 6,421,235 B2 * | 7/2002 | Ditzik | 361/679.3 |
| 6,430,038 B1 * | 8/2002 | Helot et al. | 361/679.05 |
| 6,480,373 B1 | 11/2002 | Landry et al. | |
| 6,593,859 B1 * | 7/2003 | Watanabe | 341/20 |
| 6,612,668 B2 * | 9/2003 | Doan | 312/223.2 |
| 6,643,124 B1 * | 11/2003 | Wilk | 361/679.04 |
| 6,654,234 B2 * | 11/2003 | Landry et al. | 361/679.27 |
| 6,700,773 B1 * | 3/2004 | Adriaansen et al. | 361/679.08 |
| 6,707,664 B2 * | 3/2004 | Murphy | 361/679.16 |
| 6,707,666 B1 * | 3/2004 | Chuang | 361/679.05 |
| 6,781,823 B1 * | 8/2004 | Nyack | 361/679.29 |
| 6,788,530 B2 * | 9/2004 | Hill et al. | 361/679.06 |
| 6,798,649 B1 * | 9/2004 | Olodort et al. | 361/679.13 |
| 6,816,366 B2 * | 11/2004 | Ko | 361/679.1 |
| 6,831,229 B1 * | 12/2004 | Maatta et al. | 174/66 |
| 6,870,732 B2 * | 3/2005 | Huang et al. | 361/679.17 |
| 6,902,332 B2 * | 6/2005 | McLoone | 400/472 |
| 6,903,927 B2 * | 6/2005 | Anlauff | 361/679.28 |
| 6,944,012 B2 * | 9/2005 | Doczy et al. | 361/679.15 |
| 6,975,507 B2 * | 12/2005 | Wang et al. | 361/679.21 |
| 6,989,987 B1 * | 1/2006 | Wilson et al. | 361/679.02 |
| 7,025,274 B2 * | 4/2006 | Solomon et al. | 235/472.01 |
| 7,061,472 B1 * | 6/2006 | Schweizer et al. | 345/168 |
| 7,133,280 B2 * | 11/2006 | Love | 361/679.07 |
| 7,173,814 B2 * | 2/2007 | Cohen et al. | 361/679.11 |
| D551,223 S * | 9/2007 | Luminosu et al. | D14/320 |
| 7,265,969 B2 * | 9/2007 | Jin | 361/679.09 |
| 7,349,201 B2 * | 3/2008 | Tatsukami et al. | 361/679.55 |
| 7,352,565 B2 * | 4/2008 | Yin | 361/679.55 |
| 7,471,506 B2 * | 12/2008 | Yin | 361/679.55 |
| 7,492,891 B2 * | 2/2009 | Eldon | 379/433.12 |
| 7,502,221 B2 * | 3/2009 | Fuller et al. | 361/679.55 |
| 7,545,627 B1 * | 6/2009 | Lantigua | 361/679.04 |
| 7,667,959 B2 * | 2/2010 | Pelkonen | 361/679.27 |
| 7,828,260 B2 * | 11/2010 | Hauser et al. | 248/456 |
| 2003/0048595 A1 * | 3/2003 | Hsieh et al. | 361/680 |
| 2003/0048596 A1 * | 3/2003 | Hsieh et al. | 361/680 |
| 2003/0099086 A1 * | 5/2003 | Chuang | 361/680 |
| 2003/0142474 A1 * | 7/2003 | Karidis et al. | 361/683 |
| 2003/0147205 A1 * | 8/2003 | Murphy | 361/680 |
| 2004/0108968 A1 | 6/2004 | Finke-Anlauff | |
| 2004/0259593 A1 | 12/2004 | Wang et al. | |
| 2005/0002158 A1 * | 1/2005 | Olodort et al. | 361/683 |
| 2005/0073515 A1 * | 4/2005 | Kee et al. | 345/204 |
| 2006/0056143 A1 | 3/2006 | Tatsukami | |
| 2007/0217135 A1 * | 9/2007 | Chuang et al. | 361/681 |

OTHER PUBLICATIONS

English translation of the International Search Report mailed/dated Aug. 25, 2008 (3 pages).

Chinese Office Action issued for parallel Chinese Patent Application, No. 200880022105.X, dated May 4, 2011, 13 pages.

\* cited by examiner

PORTABLE DIGITAL COMPUTER

CROSS REFERENCE TO RELATED APPLICATIONS

This application is the U.S. National Stage entry of International Application No. PCT/EP2008/003182, filed April, 2008, which claims benefit of German Application Nos. 102007019840.0, filed Apr. 25, 2007, and 102007028995.74, filed Jul. 23 2007; the contents of each are incorporated herein by reference in their entirety.

The invention relates to a portable digital computer having a housing on which a keyboard, a detachable mouse and a monitor which may be swivelled with the aid of a hinge are accommodated, and in which accumulators are accommodated.

An input device for portable digital computers is known (DE 103 30 771 A1). The wireless mouse generally used with such a digital computer is accommodated in a recess of the housing in such a way that it can be pulled out and used separately from the housing, the keyboard and the monitor, as if the digital computer were one having a separate mouse.

Proceeding from the prior art, the object of the present invention is to provide a further increase in operating convenience, which is achieved in a portable digital computer of the kind mentioned above in that the housing is configured in two parts, the two housing parts can be swivelled by another hinge parallel to the first hinge, the keyboard can be detached from the housing, a CD-ROM player and a data processor are accommodated behind the monitor, the two housing parts are designed to be laid one upon the other and serve as a support structure for the monitor and that a plurality of connection sockets are disposed on the monitor.

The digital computer according to the invention is subdivided into several separable subunits. The power supply, i.e. the accumulators, is contained in the actual housing, on which the keyboard is usually mounted in prior art computers. The housing itself consists of two parts that can be swivelled in relation to each other. In the one position, these parts can be placed one beside the other in an extended state on a support surface. In another position, these housing parts can be laid one upon the other and swivelled away from the user.

On the side facing away from the user, the monitor is equipped with a CD-ROM player, inter alia, which means that the multipart design of the actual housing in which such a device is normally accommodated does not pose any problem.

The keyboard may be removed as far as desired from the housing—and hence from the monitor as well. The same is true of the mouse. Of course, these parts are functionally linked to each other in the normal way and are connected to the processor.

The advantage of the digital computer according to the invention is considered to consist, above all, in that it can be transported like a normal digital computer, namely with a flat shape that fits into a briefcase, whereas it is possible to remove the individual parts of the computer far enough apart from each other such that the monitor can be placed in the right light to suit the needs of the operator, and that the operating elements can be easily and ergonomically reached.

Other embodiments of the invention are characterised in that the monitor can additionally be rotated about a substantially vertical axis, a printer is accommodated in one of the housing parts, the number keypad of the digital computer is embodied on a part which can be detached from one of the housing parts and said number keypad can be attached to the side of the keyboard.

The invention shall now be described with examples and with reference to the drawings, in which FIGS. 1-4 show illustrative views of the inventive digital computer in different positions.

FIGS. 1 to 5 show the housing of the computer, with two housing parts 10 and 11. The relatively heavy accumulators are located inside housing part 10, but they may also be partly accommodated in housing part 11.

Figure 1:
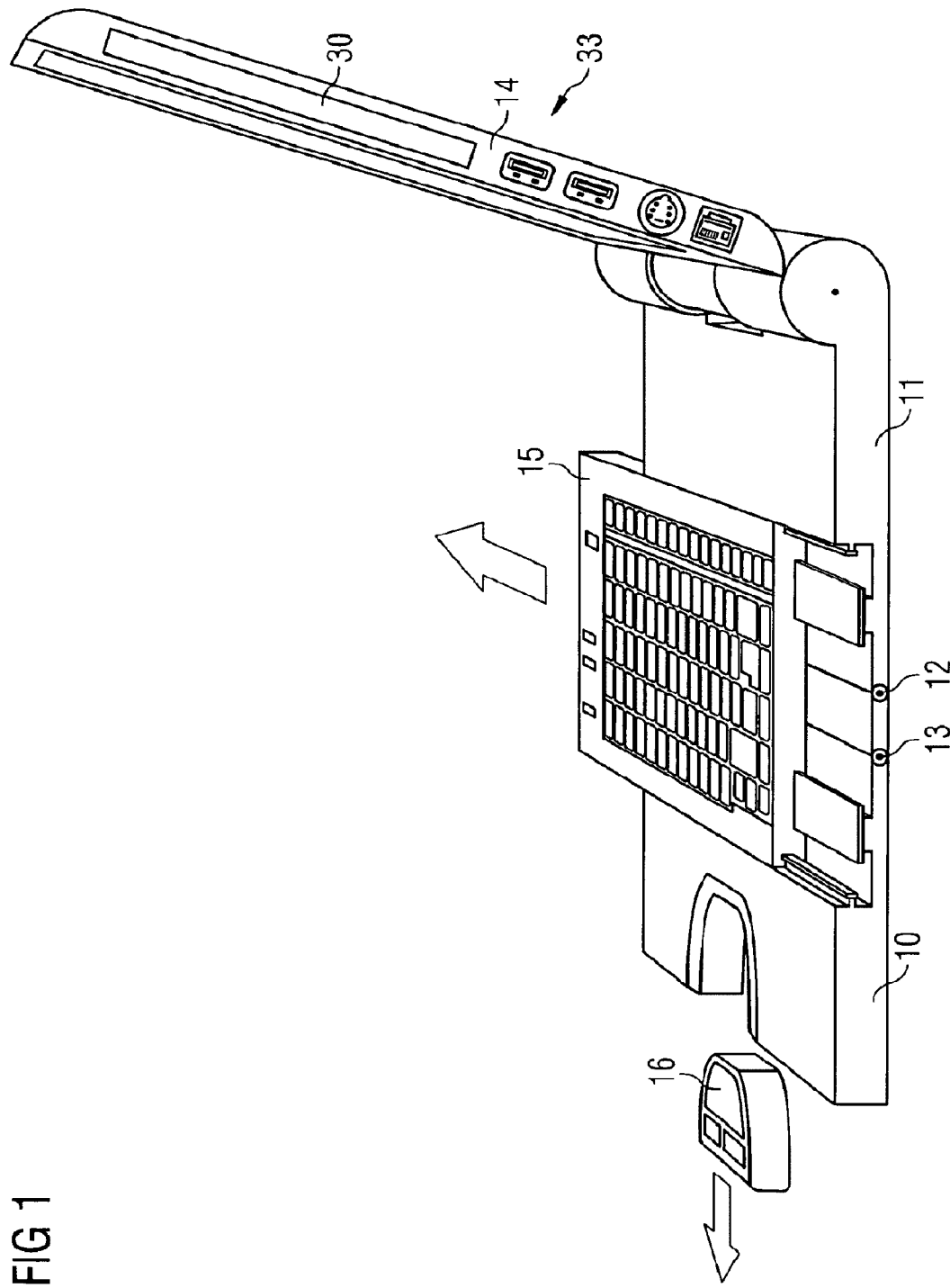
Figure 2:
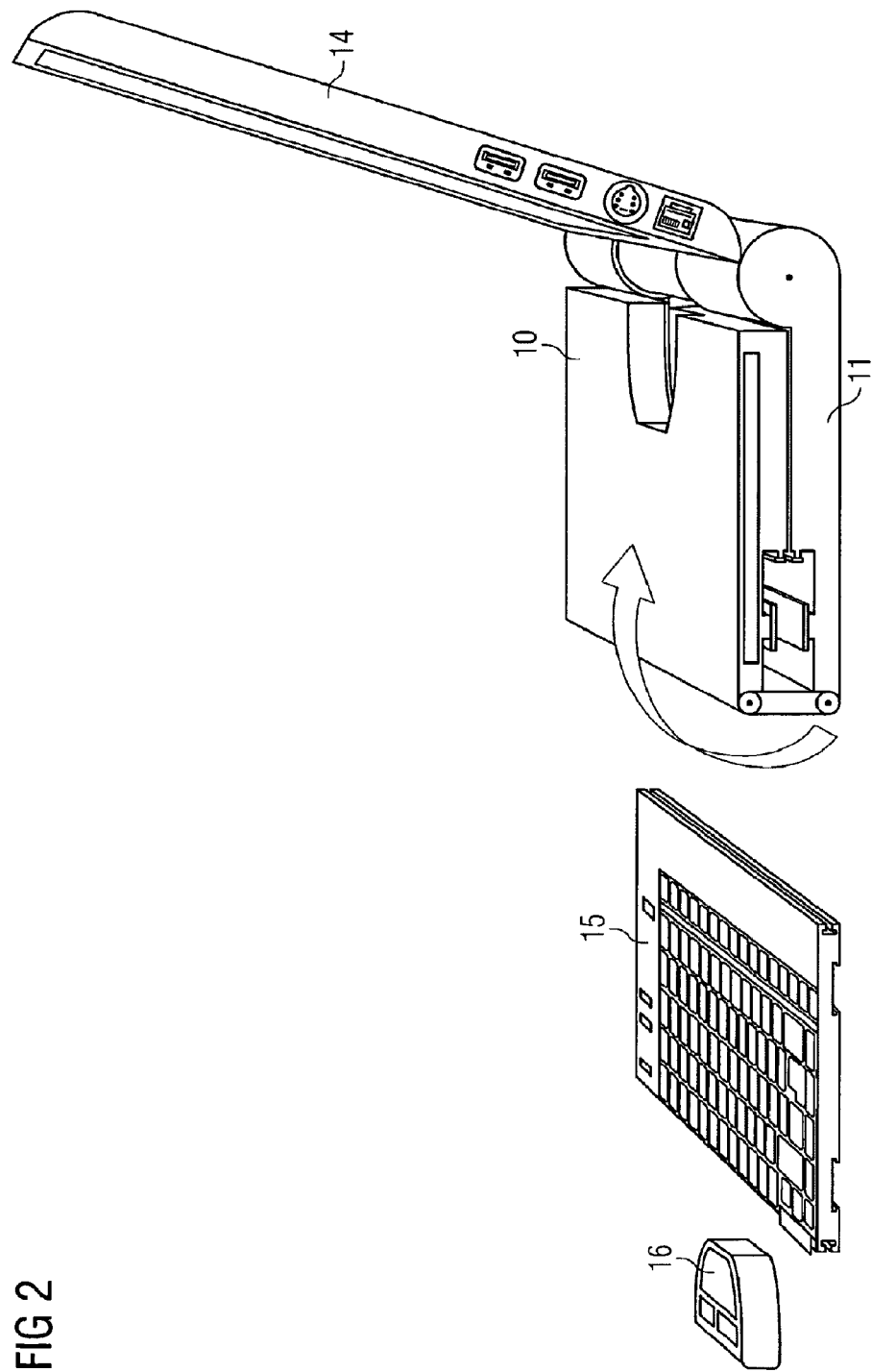
Figure 3:
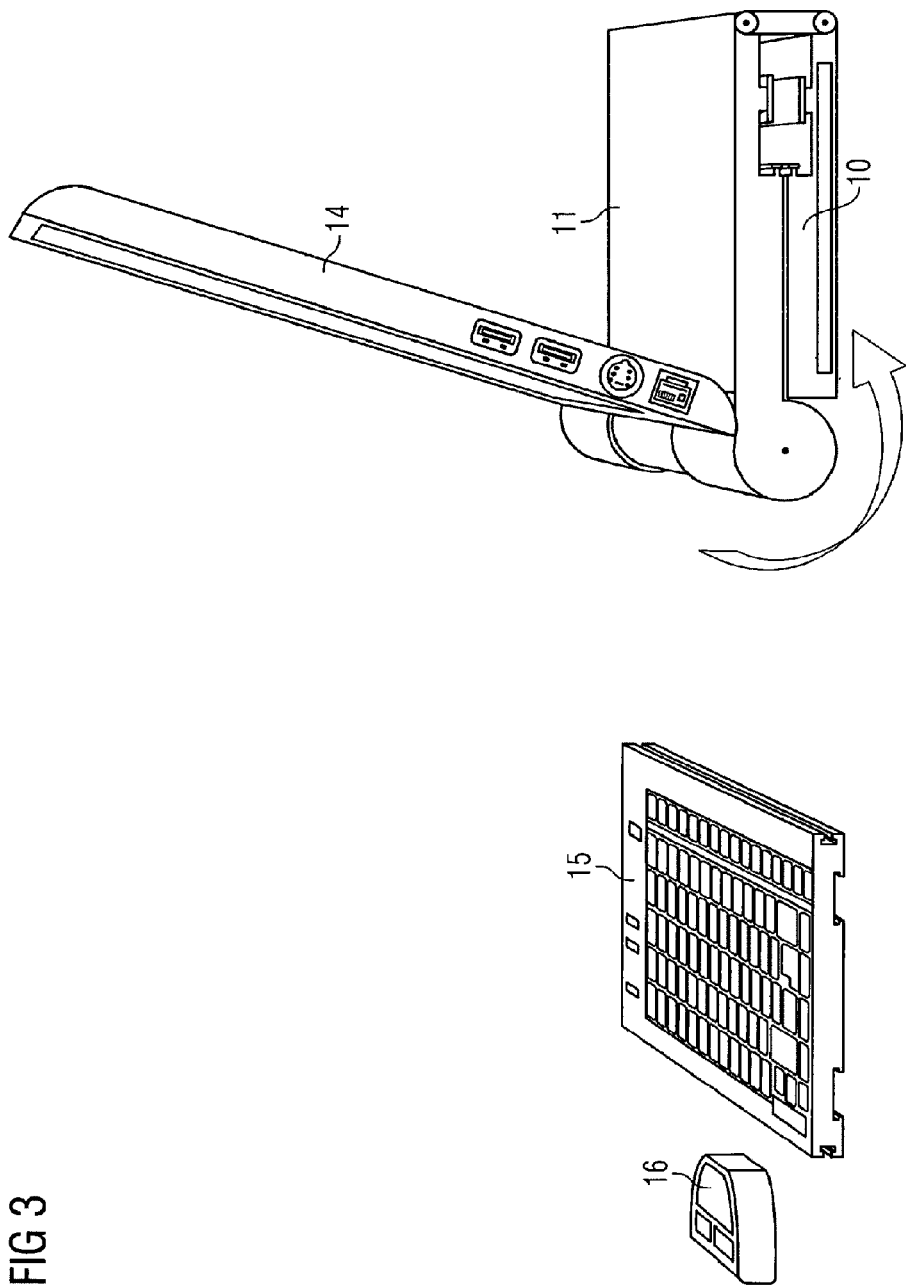

Housing parts 10 and 11 are hingedly connected to each other by swivel joints or hinges 12 and 13, such that they can readily be brought from the extended state, as shown in FIG. 1, into the positions shown in FIGS. 2 to 5.

A monitor is designated with reference sign 14. This monitor 14 is connected by a hinge to housing 10 or 11 and can therefore be moved to the appropriate position. In the embodiment shown in FIG. 4, monitor 14 is also adjustable about a vertical axis.

Housing parts 10 and 11 are provided with recesses such that keyboard 15 can be inserted and removed therefrom. The same applies to the mouse or wireless mouse 16 with touchpad, which mouse can be separated from housing part 10.

Figure 4:
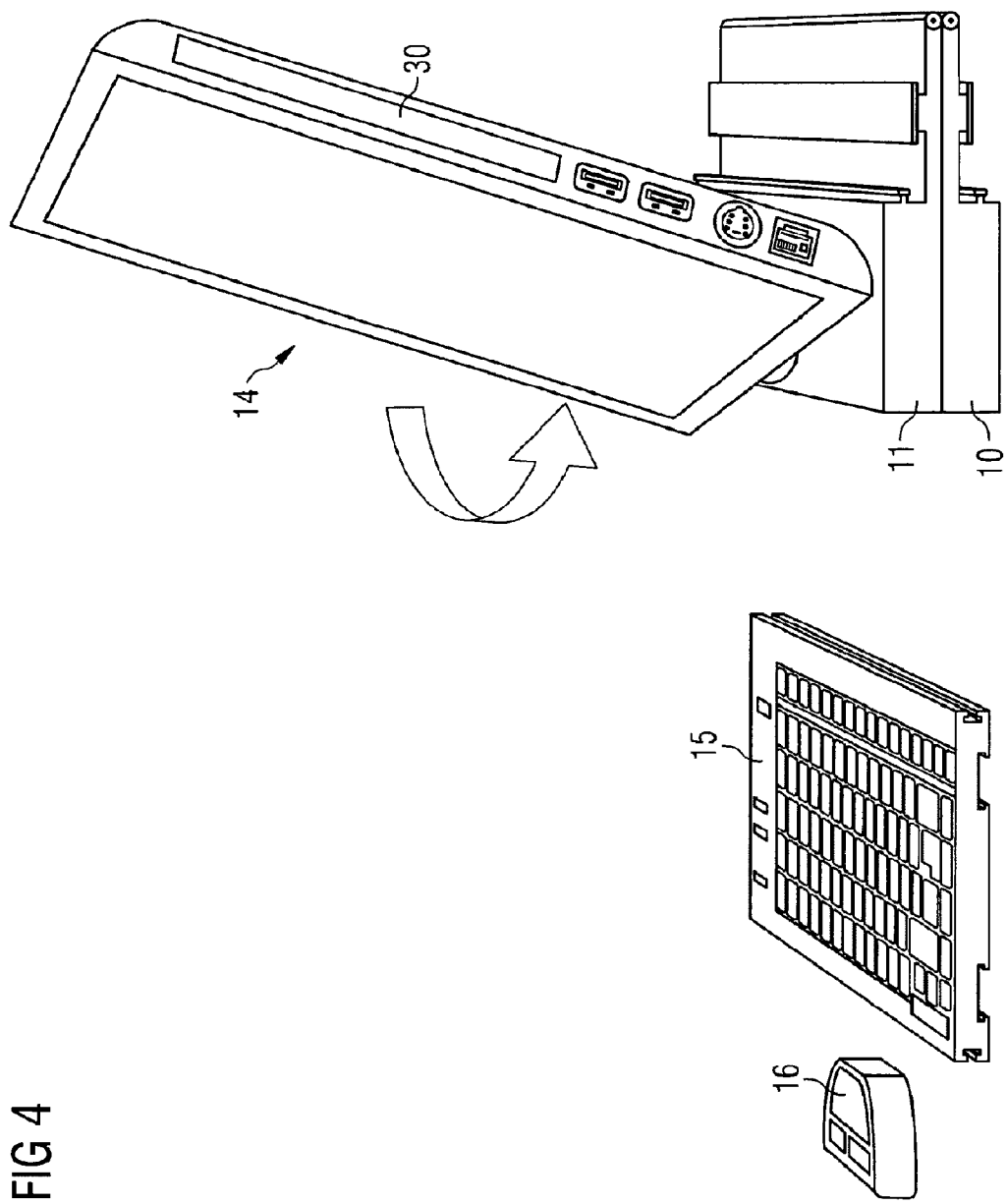

In FIGS. 1 and 4, reference sign 30 designates the CD-ROM tray of a CD-ROM player, and it can be seen from these Figures that the CD-ROM player is located behind monitor 14.

Reference sign 33 in FIG. 1 designates a plurality of connector sockets of the generally known kind, with which additional devices can be functionally connected to the inventive digital computer. These sockets are likewise located on the monitor part 14 of the inventive digital computer.

Figure 5:
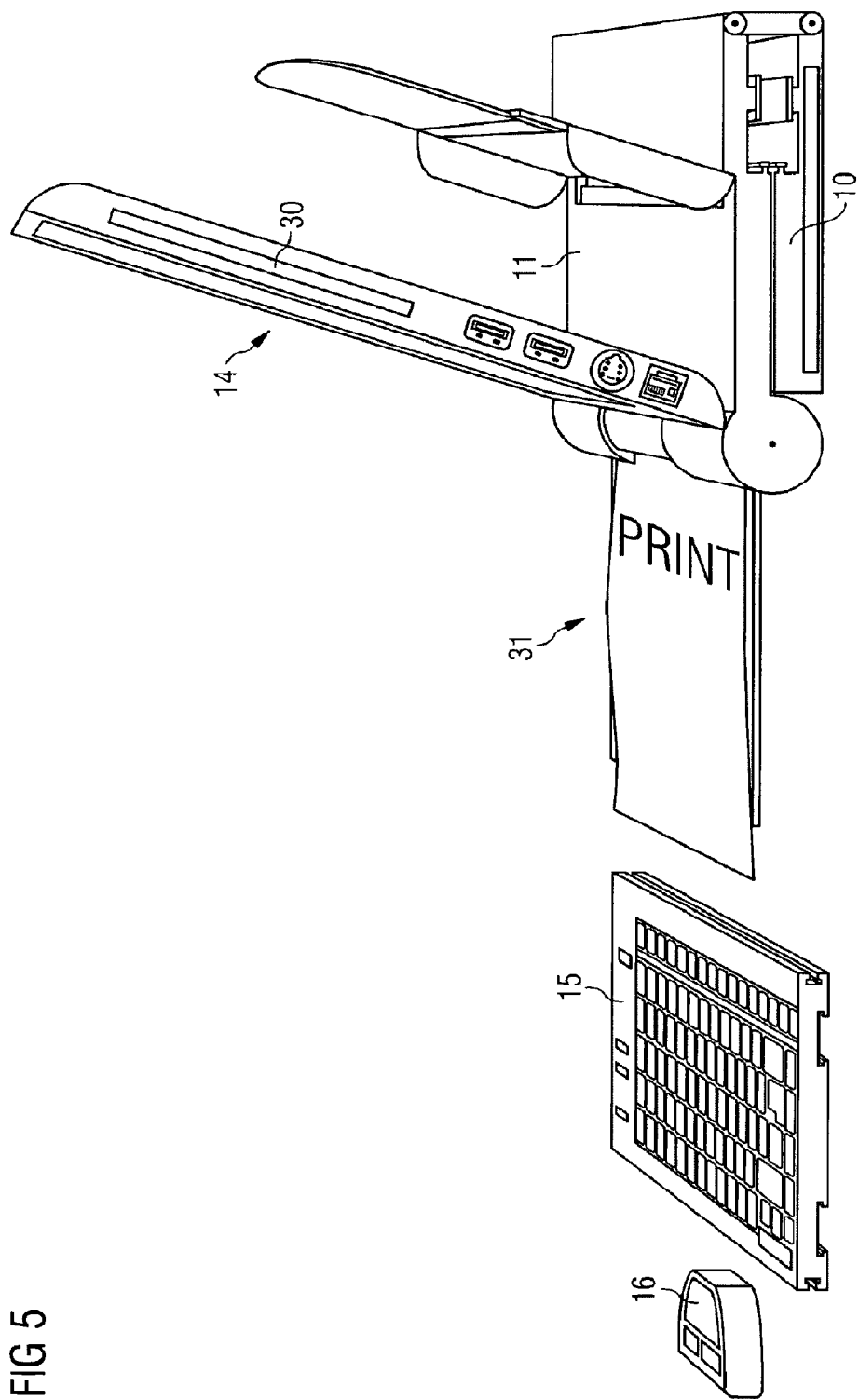
FIG. 5 shows an inventive digital computer provided with a printer.

FIG. 5 shows a special design of the inventive digital computer, in which a printer 31 is accommodated in the one housing part 11; the printer itself cannot be seen, but the tray for the paper to be printed can be seen.

Figure 6:
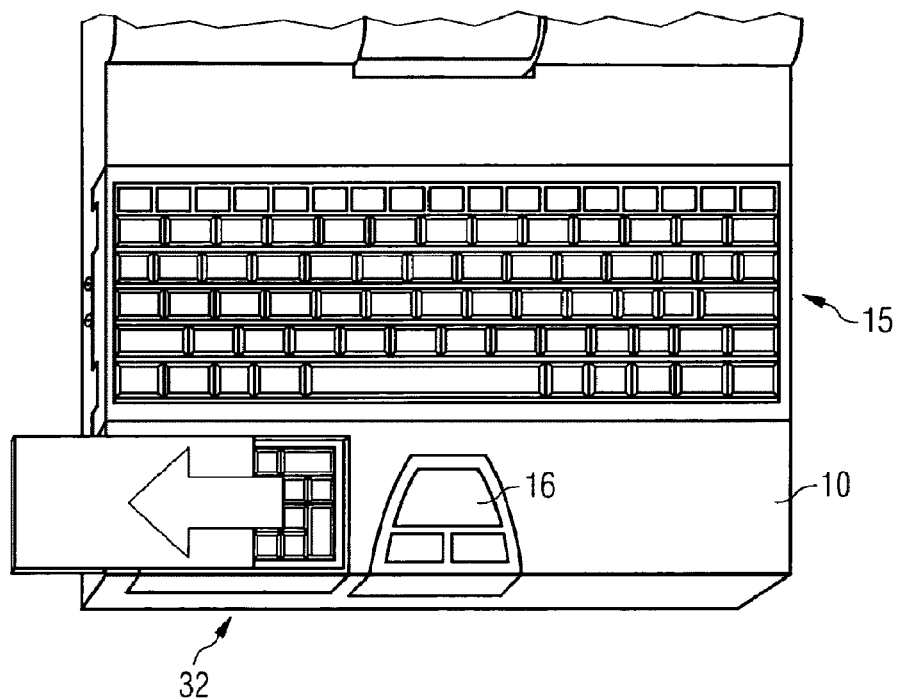
FIGS. 6 and 7 show a detachable number keypad of the inventive digital computer, in different positions.
Figure 7:
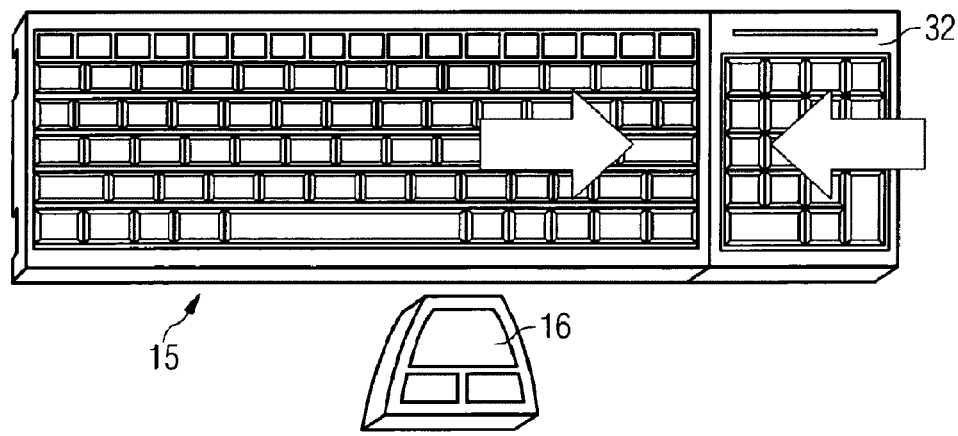

In FIGS. 6 and 7, housing part 10 is provided with a recess in which number keypad 32 is located. An arrow indicates that a cover is pushed to the side and that this part 32 with the number keypad can be removed therefrom. In one preferred embodiment, shown by FIG. 7, this number keypad 32 can be attached to the side of keyboard 15, in the manner known from rack consoles. Thus, it is also possible to work with the digital computer in the usual manner and in particular to perform computing operations.

It can best be seen from FIG. 1 that keyboard 15 is configured with recesses which interact with protrusions on housing parts 10 and 11, specifically in the manner of tongue and groove connections. In the assembled state in which keyboard 15 is in the inserted position on housing parts 10 and 11, this provides stabilisation for the housing comprising the two housing parts 10 and 11, which is advantageous during transportation, especially.

The arrows shown in the individual Figures indicate how certain parts can be removed from the housing, and how housing parts 10 and 11 can be swivelled so that they can adopt different working positions.

The invention claimed is:

1. A portable digital computer having a housing on which a keyboard, a detachable mouse and a monitor which can be swivelled with the aid of a first hinge are provided, and in which accumulators are accommodated,
wherein the housing is configured in a first part and a second part which can be pivoted by a second hinge and a third hinge parallel to the first hinge and coupling adjacent edge portions of the two housing parts,
wherein the keyboard can be detached from the housing,
wherein a CD-ROM player and a data processor are accommodated behind the monitor,
wherein the two housing parts are designed to be laid one upon the other and serve as a support structure for the monitor,
wherein a plurality of connection sockets are disposed on the monitor, and
wherein the two housing parts are configured such that the first housing part lays on the second housing part in a folded state, and the first housing part is behind the second housing part in an expanded state,
wherein the keyboard is on top of the second hinge and said third hinge when the first and second housing parts are in the expanded state.

2. The digital computer of claim 1, characterised in that the monitor can also be rotated about a substantially vertical axis.

3. The digital computer of claim 1, characterised in that a printer is accommodated in one of the housing parts.

4. The digital computer according to claim 1, characterised in that a number keypad of the digital computer is embodied on a part which is detachable from one of the housing parts.

5. The digital computer of claim 4, characterised in that the part can be attached to the side of the keyboard.

6. The digital computer of claim 2, characterised in that a printer is accommodated in one of the housing parts.

7. The digital computer according to claim 2, characterised in that a number keypad of the digital computer is embodied on a part which is detachable from one of the housing parts.

8. The digital computer according to claim 3, characterised in that a number keypad of the digital computer is embodied on a part which is detachable from one of the housing parts.

9. The digital computer according to claim 6, characterised in that a number keypad of the digital computer is embodied on a part which is detachable from one of the housing parts.

10. The digital computer of claim 7, characterised in that the part can be attached to the side of the keyboard.

11. The digital computer of claim 8, characterised in that the part can be attached to the side of the keyboard.

12. The digital computer of claim 9, characterised in that the part can be attached to the side of the keyboard.

13. A portable digital computer comprising:
a housing, the housing comprising:
a first housing part;
a second housing part; and
a coupling portion coupling an edge portion of the first housing part to an adjacent edge portion of the second housing part, wherein the coupling portion comprises a first hinge and a second hinge; wherein rotating one or both of the housing parts about the first hinge and the second hinge converts the housing from a folded state, in which the first housing part is on the second housing part, to an expanded state, in which the first housing part is adjacent to the second housing part;
a monitor comprising:
a display;
a CD-ROM player;
a data processor; and
a plurality of connection sockets;
a monitor hinge coupling the monitor to the first housing part and permitting the monitor to swivel with respect to the first housing part, the monitor hinge being substantially parallel to the first hinge and the second hinge; and
a power supply housed with one or both of the first and second housing parts,
wherein at least one of the first and second housing parts comprises a recess configured to attach to a detachable keyboard, and
wherein at least one of the first and second housing parts comprises a recess configured to attach to a detachable mouse,
wherein the keyboard is on top of the first hinge and the second hinge when the first and second housing parts are in the expanded state.

14. The digital computer of claim 13, wherein the monitor is configured to rotate about an axis substantially perpendicular to a bottom edge of the monitor.

15. The portable digital computer of claim 1 wherein the first part and the second part comprise recesses, which are configured to commonly accommodate the keyboard.

16. The portable digital computer of claim 1 wherein the first part and the second part comprise protrusions, which are configured to engage with protrusions in the keyboard.

17. The portable digital computer of claim 16 wherein the first part and the second part comprise recesses, which are configured to commonly accommodate the keyboard on top of said second hinge and said third hinge when the first and second housing parts are in the expanded state.

\* \* \* \* \*